United States Patent [19]
Fabian et al.

[11] 3,976,649
[45] Aug. 24, 1976

[54] PRODUCTION OF EASILY DISPERSIBLE, HIGH TINCTORIAL STRENGTH PERYLENE-3,4,9,10-TETRACARBOXYLIC ACID DIIMIDES

[75] Inventors: Wolfgang Fabian, Wilhelmsfeld; Klaus Schrempp, Ludwigshafen, both of Germany

[73] Assignee: BASF Aktiengesellschaft, Ludwigshafen (Rhine), Germany

[22] Filed: Apr. 1, 1974

[21] Appl. No.: 456,908

[30] Foreign Application Priority Data
Apr. 3, 1973  Germany............................ 2316536

[52] U.S. Cl. .......................... 260/281 P; 106/288 Q
[51] Int. Cl.² ........................................ C07D 471/06
[58] Field of Search ......................... 260/281, 281 P

[56]     References Cited
         UNITED STATES PATENTS
3,043,843  7/1962  Koch.................................. 260/281
3,615,800  10/1971  Spietschka et al.................. 260/281
3,752,686  8/1973  Kalz et al.......................... 106/288 Q
3,842,084  10/1974  Graser............................... 260/281

Primary Examiner—Nicholas S. Rizzo
Assistant Examiner—Mary Vaughn
Attorney, Agent, or Firm—Johnston, Keil, Thompson & Shurtleff

[57]         ABSTRACT

High tinctorial strength, easily dispersible perylene-3,4,9,10-tetracarboximides and N,N'-dialkylperylene-3,4,9,10-tetracarboximides are produced by introducing a finely ground crude pigment whose primary particle size is not more than 0.05 micron into a primary aliphatic or aromatic amine, into a heterocyclic base, into an aliphatic carboxamide, into a mixture thereof, or into from 75 to 84% by weight sulfuric acid and converting it into pigmentary form at a temperature of from ambient temperature to 160°C. The products are easily dispersible pigments of high tinctorial strength.

6 Claims, No Drawings

PRODUCTION OF EASILY DISPERSIBLE, HIGH TINCTORIAL STRENGTH PERYLENE-3,4,9,10-TETRACARBOXYLIC ACID DIIMIDES

The invention relates to a process for the production of high tinctorial strength, easily dispersible perylene-3,4,9,10-tetracarboxylic acid diimides and their N-alkyl derivatives.

Perylene-3,4,9,10-tetracarboxylic acid diimides and their N-alkyl derivatives are valuable pigments because of the great fastness to light and weathering. The crude pigments obtained in the synthesis are of no value tinctorially because they have poor color strength and are dull. For the conversion of these crude pigments into a finely dispersed pigmentary form use is made of conventional methods such as salt grinding in a ball mill or dissolving them and reprecipitating them from solution, for example in sulfuric acid. The suspensions thus obtained contain the pigment in finely dispersed form, but the pigment loses its tinctorial strength in processing, especially when drying the aqueous paste; the pigment particles become encrusted, agglomerate and become hard.

A high tinctorial strength pigment is obtained by the method described in German Pat. No. 1,115,711 when the aqueous paste of perylene-3,4,9,10-tetracarboxylic acid diimide obtainable by a conventional dispersing method, for example by reprecipitation from sulfuric acid or by grinding with salt in a ball mill followed by removal of the salt with water is heated in a high boiling point organic solvent while distilling off the azeotrope of water and diluent and then boiling the solvent. The pigment is isolated by filtration.

According to the disclosure in German Pat. No. 1,142,339 the pigmentary form is retained when finely divided perylene-3,4,9,10-tetracarboxylic acid diimide obtained by reprecipitation from sulfuric acid is intimately mixed with an oil-soluble polar compound, dried and ground.

It is known from German Pat. No. 1,619,531 that perylene-3,4,9,10-tetracarboxylic acid diimide can be converted into a high tinctorial strength pigmentary form by grinding in the presence of a solvent such as an alcohol, ketone, or aliphatic or aromatic hydrocarbon.

Furthermore variations in salt grinding of crude pigments are known in which grinding takes place in the presence of a long-chained aliphatic alcohol (German Laid-Open Specification (DOS) No. 1,914,208) or a long-chained aliphatic amine (German Laid-Open Specification (DOS) No. 2,063,714).

All the prior art methods in which a pure pigment is obtained have the disadvantage that after processing, isolation and drying of the pigmentary form a hard agglomerated pigment is obtained. In order to obtain deep-shade surface coatings, printing inks or plastics the hard pigment has to be redispersed and a considerable amount of work done on it.

It is an object of the present invention to provide a process by which high tinctorial strength perylene-3,4,9,10-tetracarboxylic acid diimides or their N-alkyl derivatives are obtained in a high tinctorial strength pigmentary form which is more easily dispersible than pigmentary forms obtained by prior art methods.

We have found that high tinctorial strength, easily dispersible perylene-3,4,9,10-tetracarboxylic acid diimides and N-alkyl derivatives thereof of one to four carbon atoms per alkyl are obtained by grinding the dry crude pigment in the presence or absence of grinding aids until the mean primary particle size is not more than 0.05 micron, the ground material is then introduced into an aliphatic or aromatic primary amine of two to eight carbon atoms, or into a saturated or unsaturated mononuclear or binuclear heterocyclic base containing basic nitrogen as a ring member, into a low molecular weight water-soluble aliphatic carboxamide, into a mixture of two or more of the same, or into from 75 to 84% by weight sulfuric acid, the mixture is mixed at a temperature of from ambient temperature to 160°C until the pigment has recrystallized and then the pigment is separated from the treatment medium by a conventional method.

The pigments obtained by the process have increased tinctorial strength, a bluer hue and markedly better dispersibility than pigments obtained by prior art methods.

The process of the invention is conveniently carried out as follows: the dry pigment is ground in the presence or preferably in the absence of grinding aids until the ground material has a mean particle size of 0.05 micron or less. Grinding is carried out as a rule in a ball mill or vibrating mill having steel balls. The grinding time is from fifteen to eighty hours and preferably from 40 to 60 hours depending on the nature of the crude pigment. The ground product is a powder whose X-ray spectrum exhibits only wide areas instead of the sharp bands originally present. Examples of suitable grinding aids are water-soluble salts such as sodium chloride or sodium sulfate.

The ground product which is of no value tinctorially is then introduced into a primary aliphatic or aromatic amine, a heterocyclic base, an aliphatic carboxamide, a mixture of the same or from 75 to 84% by weight sulfuric acid, and the whole is mixed for example by stirring or shaking.

The amount of the treatment medium has practically no effect on the conversion of the ground material into the pigmentary form (= recrystallization). For reasons of economy the mixture should be as concentrated as possible. For technical reasons however the amount of treatment medium should be such that the mixture can be stirred before, during and after recrystallization.

When sulfuric acid is used as the treatment medium it is convenient to use 75 to 84% by weight sulfuric acid in an amount which is 1.5 to 20 times and preferably from 1.5 to 10 times the weight of the ground material or the crude pigment used for grinding.

When the treatment is carried out in a primary aliphatic or aromatic amine, heterocyclic base, aliphatic carboxamide or mixture of the same it is convenient to use an amount thereof which is from 0.5 to 5 times the weight of the ground material or crude pigment.

Conversion of the ground material into the pigment form is carried out as a rule at a temperature of from ambient temperature to 160°C. When sulfuric acid is used as the treatment medium it is preferred to use a temperature of from ambient temperature to 80°C. When the conversion is carried out in an amine, heterocyclic base, aliphatic carboxamide or mixture of the same it is preferred to use a temperature of from 50° to 150°C.

The recrystallization or conversion into the pigmentary form is completed after about one hour to about twenty-four hours depending on the treatment medium used and the temperature.

A simple stirrer, high speed stirrer (dissolver), a stirred ball mill (attrition mill), a kneader or a mixer is suitable for mixing the substances depending on the flow behavior of the mixture.

Examples of primary aliphatic amines of two to eight and preferably from four to eight carbon atoms or aromatic amines of six to eight carbon atoms for use as the treatment medium are ethylamine, n-propylamine, n-butylamine, n-hexylamine, ethanolamine, 2-aminopropanol, 3-aminopropanol, β-methoxyethylamine, β-ethoxyethylamine, β-butoxyethylamine, γ-methoxypropylamine, γ-ethoxypropylamine, γ-butoxypropylamine, aniline, o-toluidine, m-toluidine, p-toluidine, the xylidines, o-chloroaniline, m-chloroaniline, p-chloroaniline, methyl anthranilate, the phenetidines, the anisidines and mixtures of the same.

Examples of saturated or unsaturated mononuclear or binuclear heterocyclic radicals which contain basic nitrogen as a ring member are pyridine, picolines, quinoline, quinaldine, morpholine, piperidine, piperazine, pyrrolidone and mixtures of the same.

Examples of aliphatic carboxamides which are suitable for the conversion into the pigmentary form are formamide, N,N-dimethylformamide, N,N-diethylformamide, N,N-dimethylacetamide, N,N-dimethylpropionamide and N,N-ethylpropionamide, and N-methylpyrrolidone is an example of a cyclic carboxamide.

Of the said treatment media n-butylamine, n-hexylamine, β-methoxyethylamine, quinoline, aniline, chloroaniline, methyl anthranilate, N,N-dimethylformamide, N,N-dimethylacetamide, N,N-dimethylpropionamide and N-methylpyrrolidone are preferred, because conversion in these media results in a particularly high tinctorial strength pigment.

From 75 to 84% and preferably from 78 to 84% by weight sulfuric acid is also suitable as a treatment medium. The rate at which the pigmentary form is obtained in sulfuric acid depends not only on the temperature but also on the concentration of the acid. Increased concentration and a higher temperature accelerate conversion into the pigmentary form. Treatment with sulfuric acid of a strength higher than 84% by weight results in large crystals which have no value tinctorially. In sulfuric acid whose concentration is lower than 75% the ground material is no longer spontaneously dispersed uniformly the conversion does not give crystals of substantially the same size. The product obtained in this way is also without value tinctorially.

Processing of the suspension of pigment and the treatment medium is carried out by a conventional method.

When an aliphatic amine is used it may be removed from the suspension for example by azeotropic distillation after the addition of water. When an amine of high boiling point is used, such as an aromatic amine or heterocyclic base, the amine is preferably dissolved by adding a strong acid such as hydrochloric acid, and the pigment separated from the acid solution and washed with water until neutral.

The amine may be liberated from the filtrate and recovered by adding an alkali metal hydroxide or another agent having an alkaline reaction.

When a carboxamide or sulfuric acid is used the mixture as a rule is discharged into water and the pigment isolated by filtration or decantation.

The perylene-3,4,9,10-tetracarboxylic acid diimides or bis-N-alkylimides obtained exhibit great tinctorial strength. The colorations exhibit a more bluish hue than perylenetetracarboxylic acid diimides obtained by prior art methods. Moreover the products of the process are markedly more easily dispersible than perylenetetracarboxylic acid diimides obtained by prior art methods.

Perylenetetracarboxylic acid diimides which are particularly readily dispersible are obtained when the pigment paste isolated in the pigmentary form after conversion of the ground material is converted into solid form by freeze drying. It is advantageous to convert the pigment as described in German Laid-Open Specification (DOS) No. 2,013,818 from the aqueous phase into an organic phase which is suitable for freeze drying and then to subject the organic phase to freeze drying after the aqueous phase has been separated.

The following Examples illustrate the process of the invention. The parts and percentages specified are by weight. Parts by volume have the same relation to parts by weight as the liter to the kilogram.

EXAMPLE 1 a. 400 parts of 3,4,9,10-perylenetetracarboxylic acid diimide is agitated for from forty to sixty hours in a vibratory ball mill (volume: 4,000 parts by volume, filled with 5,500 parts of steel balls of a diameter of from 1 to 2.5 cm). A finely particled brownish black powder which has a metallic luster on the surface and which has a higher bulk density is formed from the brownish violet powder. It may be seen from an X-ray diagram of a sample that the crystal lattice has been substantially destroyed by the grinding and this is evident in a flattening of the diffraction lines.

50 parts of the ground material and 100 parts of aniline are stirred for ten hours at 100° to 120°C under the autogeneous pressure.

The whole is cooled to 80°C and 120 parts of 35% hydrochloric acid, 2,000 parts of water are added, and the mixture is stirred for one hour at from 80° to 90°C, suction filtered while hot, and washed until devoid of aniline and neutral. The product is then dried and powdered in a laboratory mill.

A bluish maroon pigment of great tinctorial strength is obtained which differs from a pigment prepared according to Example 1 of German Laid-Open Specification (DOS) No. 1,914,208 in its markedly improved dispersibility. The grain hardness (for definition see Example 2) of the product is from 60 to 70.

The aniline used may be separated as an oil from the mother liquor by adding caustic soda solution and used again for a subsequent batch without further purification.

b. When a mixture of 100 parts of aniline and 200 parts of water is used instead of aniline and the procedure under (a) is otherwise followed a pigment is obtained which has practically the same properties and the same hue.

c. When the procedure of 1(a) is followed except that the same amount of quinoline, p-anisidine or p-chloroaniline is used instead of aniline, a pigment is obtained which has the same properties as that obtained according to 1(a).

d. When the procedure under 1(b) is repeated but the aniline is replaced by the same amount of quinoline, p-anisidine or p-chloroaniline a pigment is obtained having the same properties as that obtained according to 1(b).

EXAMPLE 2 a. A mixture of 31 parts of 98% n-butylamine (remainder: 2% of water) and 10 parts of 3,4,9,10-perylenetetracarboxylic acid diimide (ground as described in Example 1) is boiled for eighteen hours under reflux (78°C). Then there are added to the suspension 300 parts of water and 50 parts of 35% hydrochloric acid. The pigment is suction filtered and the residue is washed until neutral and devoid of amine and then dried. After having been powdered by grinding with a pestle or by grinding in a laboratory mill a high tinctorial strength maroon pigment is obtained which disperses well. When incorporated into a surface coating markedly bluer colorations having better hiding power in full color are obtained than with a pigment obtained according to Example 1 of German Laid-Open Specification (DOS) No. 1,914,208. Moreover the pigment obtained above can be dispersed better than that obtained according to German Laid-Open Specification (DOS) No. 1,914,208.

b. Dispersibility can be tested as follows: 4.5 parts of the pigment powder and 10.5 parts of a linseed oil varnish are intimately mixed with a spatula. The mixture is then passed three times through a three roll mill whose rollers are pressed together with 10 atmospheres gauge. Some of the pigment paste (colored paste A) thus prepared is put on one side and the remainder is passed under a pressure of 80 atmospheres on the rolls another three times through the roll mill (colored paste B). To determine color strength the paste is mixed with a white paste of a commercial white pigment with the same linseed oil varnish and the oil paint which is now homogeneous is painted onto a carton. The depth of color is evaluated visually or better still by taking the reflectance curve and making a calculation according to the FIAF programme (for example L. Gall, Kunststoff-Rundschau 17 (1970), pages 282 to 291).

The quotient of the color strength (CS) of pastes A and B:

$$\frac{CS \text{ (color paste } A)}{CS \text{ (color paste } B)} \times 100 = PH$$

gives the percentage of the color strength of paste A as compared with the final depth achievable (= paste B). This quotient PH is a measure of the particle hardness and consequently of the dispersibility. The more easily a pigment can be dispersed the nearer does the quotient PH approximate to the value 100 and conversely the more difficult it is to disperse the pigment the smaller the quotient PH becomes.

Pigments prepared according to Example 2 have PH values of about 60 and the pigments obtained according to German Laid-Open Specification (DOS) No. 1,914,208 have PH values of from 10 to 30.

When the abovementioned pigment pastes are converted into the solid form by freeze drying the hardness is improved to values of from 70 to 80.

EXAMPLE 3 a. A mixture of 31 parts of 98% n-butylamine (the remainder is 2% of water) and 10 parts of 3,4,9,10-perylenetetracarboxylic acid diimide which has been ground as described in Example 1 is stirred for eighteen hours at 75° to 78°C. The mixture is then diluted with 300 parts of water and the treatment agent is distilled off as an azeotrope with water up to the boiling point of water (100°C). Then 5 parts of 35% hydrochloric acid is added to the suspension and the product is suction filtered, washed until neutral, dried and powdered. A pigment is obtained which has practically the same properties as the pigment obtained according to Example 2.

b. When the procedure under 3(a) is repeated using the same amount of isobutylamine instead of n-butylamine a pigment is obtained having the same properties as in 1(a).

EXAMPLE 4

A mixture of 93 parts of 98% n-butylamine (the remaining 2% being water) and 30 parts of 3,4,9,10-perylenetetracarboxylic acid diimide which has previously been ground as described in Example 1(a) is heated for five hours at 80°C while stirring. 200 parts of water is then added and the n-butylamine is distilled off as an azeotrope up to the boiling point of water. Then 0.3 part of oleic acid and 100 parts of p-xylene are added and the water is distilled off until the temperature of the vapor has reached 136°C. The paste is solidified by cooling and then freeze-dried. A maroon pigment is obtained having particularly good tinctorial strength and very good dispersibility. The grain hardness determined as described in Example 2(b) is from 80 to 90.

EXAMPLE 5

A mixture of 50 parts of dimethylformamide and 50 parts of 3,4,9,10-perylenetetracarboxylic acid diimide which has been ground as described in Example 1(a) is stirred for ten hours at from 120° to 130°C. The mixture is diluted with 500 parts of water and 5 parts of 35% hydrochloric acid, stirred for one hour at 80° to 90°C until the mixture is homogeneous, suction filtered, the solvent washed out with water and the product dried. The pigment obtained is identical with the pigment obtained according to Example 2(a) in tinctorial strength, shade and purity.

EXAMPLE 6 a. 30 parts of 3,4,9,10-perylenetetracarboxylic acid diimide which has been ground as described in Example 1(a) is introduced in portions into 300 parts of 81% sulfuric acid at 15° to 20°C. The whole is stirred for fifteen hours at ambient temperature, poured into 1500 parts of water at 40° to 60°C and suction filtered, and the filter cake is washed until neutral and dried. A high tinctorial strength pigment is obtained whose shade is similar to that in Example 1. Full shades (i.e. coloration prepared without white pigment) are however more transparent.

b. The procedure described under 6(a) is repeated but the temperature in the sulfuric acid is raised to 50° to 60°C. The residence time in the sulfuric acid is shortened from fifteen hours to three to four hours. After processing a pigment is obtained which corresponds in its tinctorial properties to those above.

c. Comparative experiment: The procedure described under 6(a) is repeated but a 3,4,9,10-perylenetetracarboxylic acid diimide is used which has not previously been ground as described in Example 1(a). The pigment obtained is greatly inferior in tinctorial strength and purity to those obtained in 6(a) and 6(b).

The concentration of the sulfuric acid may be varied between 80 and 84% without affecting the quality. At concentrations of more than 85% and less then 75% products which are inferior tinctorially are obtained.

EXAMPLE 7 a. 400 parts of N,N'-dimethyl-3,4,9,10-perylenetetracarboxylic acid diimide is agitated for twenty-four hours in a vibratory mill (4,000 parts by volume filled with 5,500 parts of steel balls of a diameter of from 1 to 2.5 cm). The brownish red powder is thus converted into a finely particled brownish violet powder of higher bulk density which has a superficial metallic luster.

50 parts of the ground material and 75 parts of quinoline are stirred for fifteen hours at 120°C. The whole is then cooled to 80°C, 1000 parts of water and 60 parts of 35% hydrochloric acid are added, and the mixture is stirred for one hour at from 80° to 90°C, suction filtered while hot and washed until free from quinoline. The product is then dried and powdered in a laboratory mill. A yellowish red pigment is obtained having good tinctorial strength and good dispersibility.

b. The procedure described in 7(a) is repeated using the same amount of methyl anthranilate instead of quinoline. A pigment of the same tinctorial type is obtained after processing.

EXAMPLE 8 a. 30 parts of N,N'-dimethyl-3,4,9,10-perylenetetracarboxylic acid diimide which has been ground as described in Example 7(a) is introduced in portions into 300 parts of 80.5% sulfuric acid at 15° to 20°C. The whole is stirred for fifteen hours at ambient temperature and then the mixture is introduced into 1,500 parts of water at 40° to 60°C. The precipitate is suction filtered and the filter cake is washed until neutral and free from sulfate and dried. A high tinctorial strength pigment is obtained whose properties are practically the same as those of the pigment prepared according to Example 7(a).

b. Comparative experiment: The procedure described in 8(a) is repeated but an N,N-dimethyl-3,4,9,10-perylenetetracarboxylic acid diimide is used which has not been ground as described in Example 7(a) prior to treatment. The pigments obtained according to Example 8(a) or Example 7 have considerably greater tinctorial strength and higher purity than the pigment according to Example 8(b).

We claim:
1. In a process for the production in pigmentary form of perylene-3,4,9,10-tetracarboxylic acid diimide or the corresponding N-alkyl diimides of one to four carbon atoms in each alkyl, the improvement for producing a pigment which has high tinctorial strength and is easily dispersible which comprises the steps of:

grinding the crude pigment until the mean primary particle size is not more than 0.05 micron;

introducing the ground material into a treatment medium which consists essentially of an aliphatic primary amine selected from the group consisting of ethylamine, n-propylamine, n-butylamine, n-hexylamine, ethanolamine, 1-aminopropanol, 3-aminopropanol, $\beta$-methoxyethylamine, $\beta$-ethoxyethylamine, $\beta$-butoxyethylamine, $\gamma$-methoxypropylamine, $\gamma$-ethoxypropylamine, $\gamma$-butoxypropylamine or a mixture of the same;

mixing the ground pigment in said medium at a temperature of from ambient temperature to 160°C until the pigment has recrystallized; and then separating the pigment from the treatment medium.

2. A process as claimed in claim 1 wherein the treatment is carried out at from 50° to 150°C.

3. A process as claimed in claim 1 wherein the weight of treatment medium used is from 0.5 to 5 times the weight of crude pigment.

4. A process as claimed in claim 1 wherein the recrystallized pigment is isolated by freeze drying.

5. A process as claimed in claim 1 wherein perylene-3,4,9,10-tetracarboxylic acid diimide is used as the crude pigment.

6. A process as claimed in claim 1 wherein N,N'-dimethylperylene-3,4,9,10-tetracarboxylic acid diimide is used as the crude pigment.

* * * * *